(12) United States Patent
Kaldas et al.

(10) Patent No.: US 8,805,798 B2
(45) Date of Patent: Aug. 12, 2014

(54) DATA CLEANING

(75) Inventors: Ihab Francis Ilyas Kaldas, Doha (QA); George Beskales, Doha (QA); Ahmed Elmagarmid, Doha (QA)

(73) Assignee: Qatar Foundation, Doha (QA)

( * ) Notice: Subject to any disclaimer, the term of this patent is extended or adjusted under 35 U.S.C. 154(b) by 126 days.

(21) Appl. No.: 13/468,938

(22) Filed: May 10, 2012

(65) Prior Publication Data

US 2013/0275393 A1 Oct. 17, 2013

(30) Foreign Application Priority Data

Apr. 12, 2012 (GB) .................................... 1206444.0

(51) Int. Cl.
*G06F 7/02* (2006.01)
*G06F 17/30* (2006.01)

(52) U.S. Cl.
USPC ............ 707/692; 707/602; 707/687; 707/691

(58) Field of Classification Search
None
See application file for complete search history.

(56) References Cited

U.S. PATENT DOCUMENTS

2010/0083029 A1* 4/2010 Erickson et al. ................... 714/2
2014/0025645 A1* 1/2014 Brown et al. ................. 707/691

OTHER PUBLICATIONS

"Modeling and querying Possible Repairs in Duplicate Detection" by Beskales et al, University of Waterloo, Jun. 2009, retrieved from http://www.vldb.org/pvldb/2/vldb09-370.pdf on Nov. 15, 2013.*
International Search Report in GB1206444.0, dated Jul. 12, 2012.

* cited by examiner

*Primary Examiner* — Bruce Moser
(74) *Attorney, Agent, or Firm* — Mossman Kumar & Tyler PC

(57) ABSTRACT

A computer-implemented method comprising partitioning data representing an input instance of a database including multiple tuples into multiple fragments of tuples, detecting tuples which violate a data quality specification in respective ones of the fragments, selecting a data cleaning asset on the basis of characteristics of errors in detected tuples for a fragment and based on declared asset capabilities, assigning a selected data cleaning asset to the fragment, the selected data cleaning asset to provide a set of candidate corrections for the detected tuples in the fragment, providing data representing an output instance of the database in which detected tuples are replaced with selected candidate corrections.

12 Claims, 6 Drawing Sheets

|    | Surname  | GivenName | Gender | BirthDate    | Phone           | Income |
|----|----------|-----------|--------|--------------|-----------------|--------|
| t1 | White    | Jack      | Male   | 5 Jan 1980   | +1-923-234-4532 | 60k    |
| t2 | Webb     | Danielle  | Female | 9 Nov 1990   | +1-817-213-1211 | 120k   |
| t3 | Dixon    | Matthew   | Male   | 23 Aug 1985  | +1-246-481-0992 | 87k    |
| t4 | Blake    | Danielle  | Male   | 9 Dec 1974   | 8179889211      | 100k   |
| t5 | Li       | Hong      | Female | 27 Oct 1970  |                 | 90k    |
| t6 | Zhang    | Jian      | Male   | 14 Apr 1958  | +1-912-143-4981 | 55k    |
| t7 | McCarthy | Sam       | Male   | 19 Jul 1955  | (889)321-4232   | 92k    |
| t8 | Wu       | Ning      | Male   | 19 Jul 1945  | +1-313-134-9241 | 90k    |
| t9 | Wu       | Ning      | Male   | 19 Jul 1945  | +1-313-872-7288 | 95k    |

Figure 3

DATA CLEANING

CROSS REFERENCE TO RELATED APPLICATIONS

This application claims foreign priority from UK Patent Application Serial No. 1206444.0, filed 12 Apr. 2012.

BACKGROUND

Due to the volume of data in circulation and the heterogeneity of data sources and imperfect data collection/extraction, data used in modern applications such as data warehousing, data analysis, and web data extraction typically contains errors and anomalies. Examples of errors which can be present in a database include duplicate records, records which violate one or more integrity constraints, records with missing values, heterogeneous data formats, and syntactical errors. A large number of known data cleaning systems address different types of errors with different quality and performance guarantees. A common goal among data cleaning systems is to provide scalable cleaning algorithms that generate high quality data repairs.

Typically, the majority of the existing data cleaning systems depend on automated cleaning of the data with minimal user intervention. If intervention is present, it comprises deciding which cleaning algorithms to use and adjusting parameters of the cleaning algorithms for example. Some systems allow a user to be more involved by providing an interactive data cleaning approach, which can potentially improve the quality of the generated data repairs. However, such data cleaning systems involve only a single user in the cleaning process, and thus do not scale well to large amounts of data.

SUMMARY

According to an example, there is provided a computer-implemented method comprising partitioning data representing an input instance of a database including multiple tuples into multiple fragments of tuples, detecting tuples which violate a data quality specification in respective ones of the fragments, selecting a data cleaning asset on the basis of characteristics of errors in detected tuples for a fragment and based on declared asset capabilities, assigning a selected data cleaning asset to the fragment, the selected data cleaning asset to provide a set of candidate corrections for the detected tuples in the fragment, providing data representing an output instance of the database in which detected tuples are replaced with selected candidate corrections. In an example, conflicts in candidate corrections are resolved. Resolving conflicts can include selecting a correction which has a relatively higher confidence measure. Resolving conflicts can include selecting corrections by determining a clean database instance that includes the maximum number tuples which obey the data quality specification. In an example, a set of data cleaning assets can be registered to declare capabilities of the asset. Multiple data cleaning assets can be assigned to the fragment to provide redundant sets of candidate corrections. Providing an output instance of the database can include selecting a candidate correction for a tuple with a relatively higher confidence measure from measures for the candidate corrections in the redundant sets. A confidence measure can include a measure representing a majority vote for a tuple from multiple candidate corrections for the tuple from the redundant sets. A data cleaning asset is a machine-based or a human asset. A machine-based asset can include an apparatus as described below with reference to FIG. 5 or 6.

In an example, multiple candidate corrections from assets for a tuple can be reconciled from the multiple candidate corrections from the redundant sets. Reconciling can include providing a candidate correction which complies with the data quality specification.

According to an example, there is provided a system comprising a database including multiple data records to be cleaned, multiple data cleaning assets to determine a set of data records of the database which violate at least one data quality description, and a selection and allocation module to select a data cleaning asset from a set of assets including a user from a crowdsourcing system and a machine-based data cleaning asset, and to allocate a selected asset to a fragment of the data records in the set, the selected asset to generate a candidate correction for a data record in the set. A processor can be provided to select candidate corrections by determining a clean database instance that includes the maximum number tuples which obey the data quality description. The selection and allocation module can assign an asset to the fragment to provide redundant sets of candidate corrections. The processor can select candidate corrections using a confidence measure which includes a measure representing a majority vote for a tuple from multiple candidate corrections for the tuple from redundant sets of corrections. A data cleaning asset is a machine-based or a human asset. A machine-based asset can include an apparatus as described below with reference to FIG. 5 or 6. The processor can reconcile multiple candidate corrections from assets for a tuple from the multiple candidate corrections from the redundant sets.

According to an example, there is provided a computer program embedded on a non-transitory tangible computer readable storage medium, the computer program including machine readable instructions that, when executed by a processor, implement a method comprising, partitioning data representing an input instance of a database including multiple tuples into multiple fragments of tuples, detecting tuples which violate a data quality specification in respective ones of the fragments, selecting a data cleaning asset on the basis of characteristics of errors in detected tuples for a fragment and based on declared asset capabilities, assigning a selected data cleaning asset to the fragment, the selected data cleaning asset to provide a set of candidate corrections for the detected tuples in the fragment, providing data representing an output instance of the database in which detected tuples are replaced with selected candidate corrections.

BRIEF DESCRIPTION OF THE DRAWINGS

An embodiment of the invention will now be described, by way of example only, and with reference to the accompanying drawings, in which:

FIG. 3 is a portion of a database instance including tuples which violate multiple data quality specifications;

DETAILED DESCRIPTION

Figure 1:
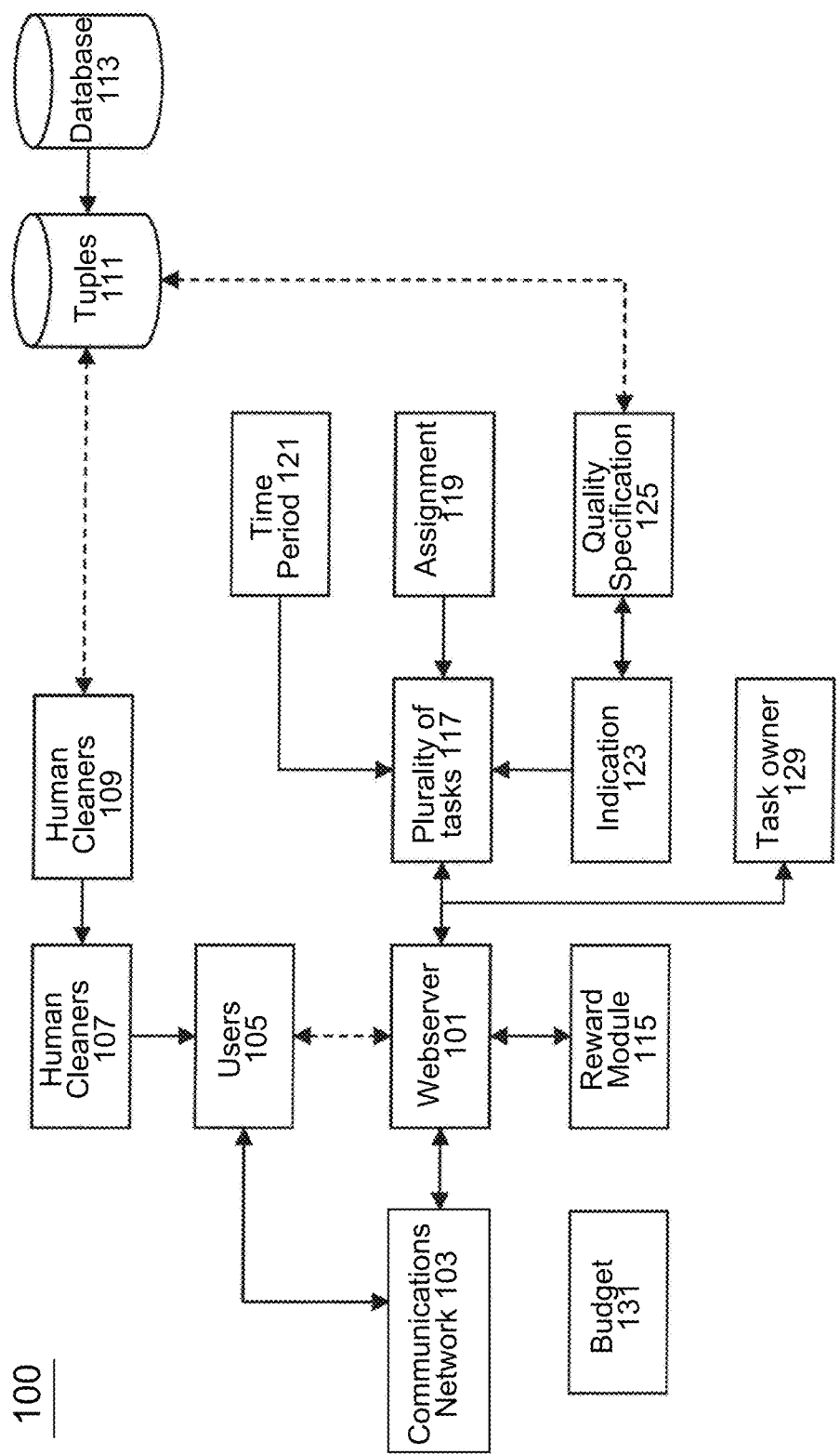
FIG. 1 is a schematic block diagram of a typical crowdsourcing system according to an example.

It will be understood that, although the terms first, second, etc. may be used herein to describe various elements, these elements should not be limited by these terms. These terms are only used to distinguish one element from another. The terminology used herein is for the purpose of describing particular examples only and is not intended to be limiting. As used herein, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In an example, a data cleaning framework allows the quality and efficiency of data cleaning to be improved through the use of crowdsourcing and parallel computing in the data cleaning process. Crowdsourcing refers to using a large number of humans to help perform a specific task, and can be described, for example, where solutions to tasks are solicited or allocated by making calls to large scale communities of 'workers'. Parallel computing refers to using multiple machines in parallel to perform a specific task.

In an example, a data cleaning system for a database uses data quality specifications that should be met by the data to be cleaned. Such specifications allow the identification of errors in data and the assessment of quality in a resulting database instance. The system includes the use of human-cleaners as well as machine-based cleaning in order to provide a database instance devoid of errors. The human- and machine-cleaners can be collectively termed as data cleaning assets. In an example, a machine-cleaner is a device with a memory and a processor which can execute a program, such as a program embedded on a non-transitory tangible machine readable storage medium, the program including machine readable instructions that, when executed by the processor of the device, implement a method for detecting, identifying, reconciling and repairing data records of a database, which data records can be tuples which violate one or more data quality specifications for example.

Each cleaner, whether a human-cleaner or a machine cleaner, is registered in the system in order to declare the capabilities and the limitations of the cleaner. For example, each cleaner has an associated scope relating to the type and scale for the database that can be cleaned using such a cleaner, a confidence measure for the data repairs typically generated by the cleaner, and the maximum capacity of data that can be processed at each invocation.

Following identification of parts of a database to be cleaned that do not meet an imposed quality specification a human cleaner can be selected in an example. That is, it is determined which cleaner can be used for each unclean data part. Matching is performed based on the characteristics of the errors found in data and the capabilities of the available cleaners. Each part of data that violates the quality specification can therefore be assigned to one or more cleaners that match this part of data. Determining the number of cleaners to assign depends on the quality requirements and the given budget for performing the cleaning task for example.

Following data cleaning, cleaning decisions can be then collected from the assigned cleaners, and any conflicts in decisions can be resolved, for example, using the majority consensus. Database entries can then be amended or otherwise corrected with final decisions to provide a corrected database instance.

FIG. 1 is a schematic block diagram of a typical crowdsourcing system according to an example. Crowdsourcing system 100 includes a web server 101 or other computing-based device connected to a communications network 103 such as the Internet or other suitable communications network. The system can communicate with multiple users 105 over the network 103, which users can include human cleaners 107 with varying capabilities 109 in relation to cleaning of tuples (records) 111 in a database 113. In an example, the crowdsourcing system 100 can be communicatively coupled to a reward module 115 which can be integral with the system 100. The reward module 115 can be used to set rewards for all cleaning tasks of the system. In case that data to be cleaned cannot be publicly revealed because of privacy concerns for example, users 105 can include a number of trusted experts.

Crowdsourcing system 100 stores or has access to details of a plurality of tasks 117, each of which may have an associated reward which can be stored in the reward module 115. A task can include an assignment 119 and a time period 121 for completing the assignment. Further, a task can include a indication 123 of a minimum level of quality required for an assignment before a reward can be triggered, which quality can be measured using a quality specification 125 in respect of the data to be cleaned 111 in database 113. Each task can have a task owner 129 who can be different for each task or assignment. A task owner can be any entity such as an enterprise or individual and who can specify requirements for a task which can include a budget for any rewards offered for example. For each task, a budget 131 can be provided as input to the crowdsourcing system 100.

Figure 2:
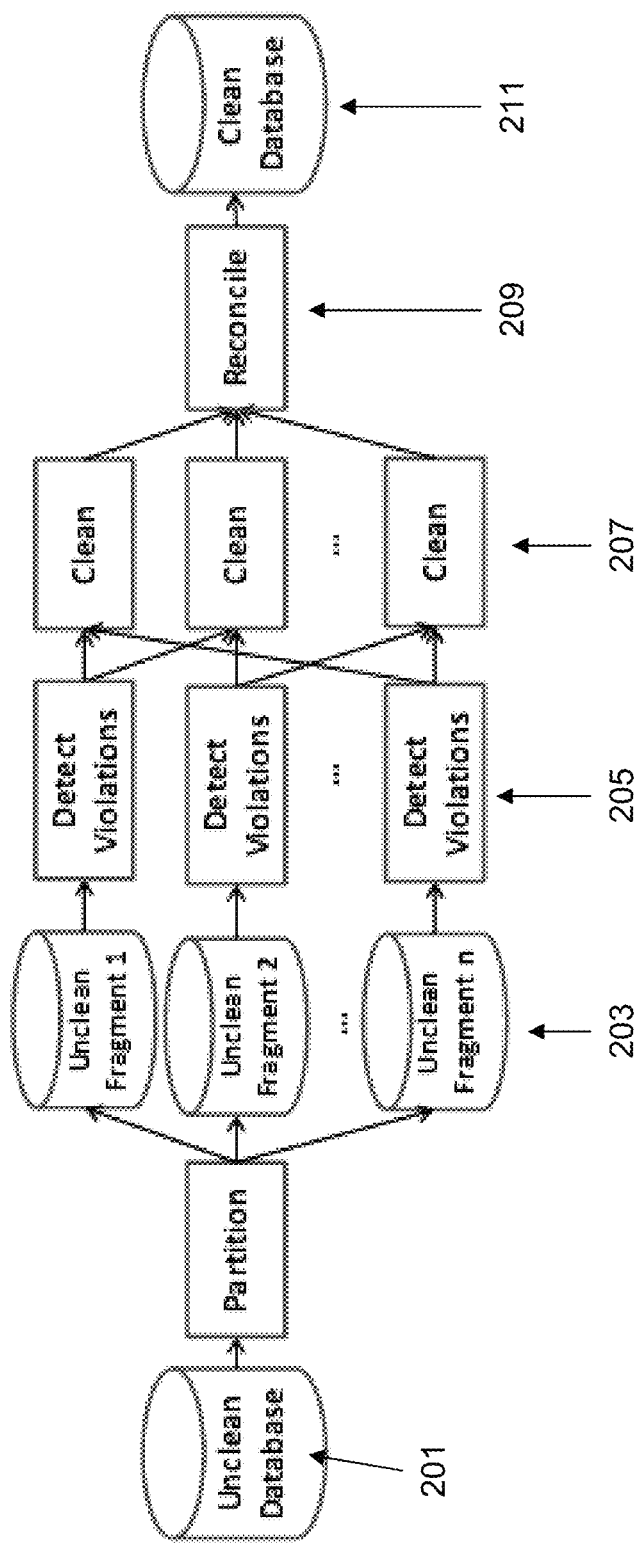
FIG. 2 is a schematic block diagram of a method according to an example.

FIG. 2 is a schematic block diagram of a method according to an example. A database instance 201 which includes tuples which violate one or more data quality specifications is provided. In an example, a data administrator can provide a set of quality specifications that should be satisfied. Examples of such specifications are functional dependencies (FDs), inclusion dependencies (INDs), duplicate elimination rules, and standard formats of attribute values.

In an example, each cleaner (either a human-cleaner or a machine-cleaner) is registered before being used in data cleaning tasks. The purpose of the registration process is to specify the capabilities of each cleaner. More specifically, each cleaner can be associated with the following information:

the types of data quality problems that can be detected and/or resolved, along with a measure representing the confidence of the repairs provided for each error type;

the scope of the cleaner, which determines parts of a database that can be examined and cleaned by the cleaner, and which can be represented as a SQL query for example;

the maximum amount of data that can be processed at each invocation; and the cost of cleaning a set of tuples.

Capabilities of cleaners could be either explicitly declared by the cleaners themselves, or be learned based on previous interactions with the cleaners. For example, if it is observed that a cleaner provides good-quality repairs for a certain part of the data, the scope of this cleaner can be adjusted to reflect such information. Whether a repair is good quality or not can be judged with reference to the data quality specification. That is, if repaired data adheres to a data quality specification it can be classed as a good repair. Varying levels of confidence can be provided with finer levels of granularity. For example, a distance measure between a cleaner-repaired tuple and a reference tuple in which no errors exist can be used to provide a measure representing a confidence value in a cleaner. Multiple such values over multiple tuples can be aggregated to provide an average measure for example.

In an example, tuples in instance 201 can be partitioned into multiple fragments 203, particularly before any data modifications are carried out. Each fragment F (203) includes multiple tuples from database instance, D, 201. The tuples in fragments 203 can overlap such that the same tuple is present in more than one fragment.

Registered cleaners are used to detect violations of the data quality specifications in blocks 205. Each fragment can be provided to one or more cleaners that cover such a fragment. In an example, detecting violations can be preformed by machine cleaners and/or human cleaners. Some quality requirements are easier to describe and to assess than others. For example, a functional dependency X→Y has a well-defined format, and a straightforward procedure to detect violations. On the other hand, deciding whether data is complete and current is more difficult. In general, human-cleaners can be used to detect violations for complex quality requirements and to propose possible repairs by, for example, searching other external data sources. With reference to FIG. 1, data representing a fragment can be provided to a user 105 over the network 103.

Following the detection in blocks 205, cleaners that can be used for repairing each part of the database that violates at least one quality requirement are determined. Matching cleaners and unclean data depends on a number of factors such as:

the amount of overlap between the unclean part and the scope of the cleaner;

the types of errors existing in the unclean part and the types of errors repairable by the cleaners; and the size of the data part compared to the maximum capacity of the cleaners.

Following a matching stage, each pair consisting of a cleaner and an unclean data part is associated with a score reflecting the expected gain in quality when the cleaner is used for cleaning the data part. In an example, one indication for the improvement in quality is the number of data errors and integrity constraint violations that have been resolved by cleaners.

In an assignment stage, cleaners that should be used to repair the unclean parts of the database based on the computed scores are determined. In general, one or more cleaners that match each unclean part of data are selected. Using more than one cleaner can increase the redundancy in cleaning decisions obtained by the cleaners, which allows more robust and confident cleaning of data. The amount of redundancy is selected based on several factors such as the cost budget, the required confidence about the cleaned database, and the available cleaners. Using multiple cleaners can potentially result in conflicts among the feedback obtained from the cleaners.

There exist multiple methods to resolve conflicts in cleaner feedback relating to tuple repairs. For example, one method is to adopt the decisions that have the highest confidence among the conflicting decisions. Another method is to automatically determine a clean database instance that includes the maximum number of consistent cleaning decisions. Another alternative is to send every set of conflicting decisions to a human-cleaner to decide how to resolve the conflicts.

Typically, assigning cleaners to all parts of the database with violations is performed in a holistic way rather than considering individual parts separately. Holistic assignment of cleaners allows global objectives to be optimised, such as the following objectives for example:

providing maximum load balance and utilization of cleaners. This is translated into minimizing the time required for completing the entire cleaning process minimizing the overall cost of the cleaning process;

having a global degree of confidence about the obtained clean instance.

Cleaning tasks are executed according to a predefined schedule by sending data parts to the assigned cleaners in blocks 207. Due to the large number of cleaners, exceptions in execution are expected (such as failure of machines, and having non-responsive cleaners for example). In an example speculative execution, in which multiple workers are used simultaneously to complete a given task can be used.

Following cleaning in blocks 207 in which repairs are suggested or otherwise provided by cleaners, conflicts are resolved and the fragments are reconciled in block 209 to provide a clean database instance 211.

FIG. 3 is a portion of a database instance including tuples which violate multiple data quality specifications. The quality specifications for records in the example in FIG. 3 are defined as follows:

i) no duplicate records
ii) no missing values in records
iii) FD: GivenName→Gender
iv) standard format for telephone number The first requirement prevents existence of duplicate records, the second requirement prevents existence of missing values, the third requirement defines a functional dependency (FD) GivenName→Gender, which indicates that all persons with the same given name must have the same gender, and the fourth requirement enforces use of a standard format for telephone numbers.

According to the quality requirements, a number of violations are shown as shaded cells in FIG. 2. For example, $t_2$ and $t_4$ have the same given name, 'Danielle', but the two tuples disagree on the attribute 'Gender'. The values of attribute Phone of $t_4$ and $t_7$ are not in the standard format, and the value of attribute Phone of $t_5$ is missing. Also, tuples $t_8$ and $t_9$ are duplicates. In this example, assume that three cleaners are registered, whose scopes are shown as dashed rectangles in FIG. 2.

The first cleaner is capable of detecting and resolving violations of FD GivenName→Gender and the scope of this cleaner can be defined using a SQL query such as:

SELECT GivenName, Gender
FROM Person

The second cleaner is capable of detecting heterogeneity in telephone numbers, reformatting the phone numbers based on the standard format, and detecting missing phone numbers. The scope of this cleaner can be defined as:

SELECT Phone
FROM Person

The third cleaner can detect and eliminate duplicate records for persons whose birth dates are before 1960. The scope of this cleaner can be defined as:

SELECT*
FROM Person
WHERE Year (BirthDate)<1960

The first cleaner matches the data part consisting of tuples GivenName and Gender of tuples $t_2$ and $t_4$. On the other hand, the missing phone number of tuple $t_5$ matches the second cleaner. Accordingly, the fragment of the database consisting of attributes GivenName and Gender is passed to the first cleaner. As a result, tuples $t_2$ and $t_4$ are marked as violations with absolute confidence. Also, tuples $t_6$, $t_7$, $t_8$ and $t_9$ are passed to the third cleaner, which marks $t_8$ and $t_9$ as duplicates with high confidence.

Figure 4:
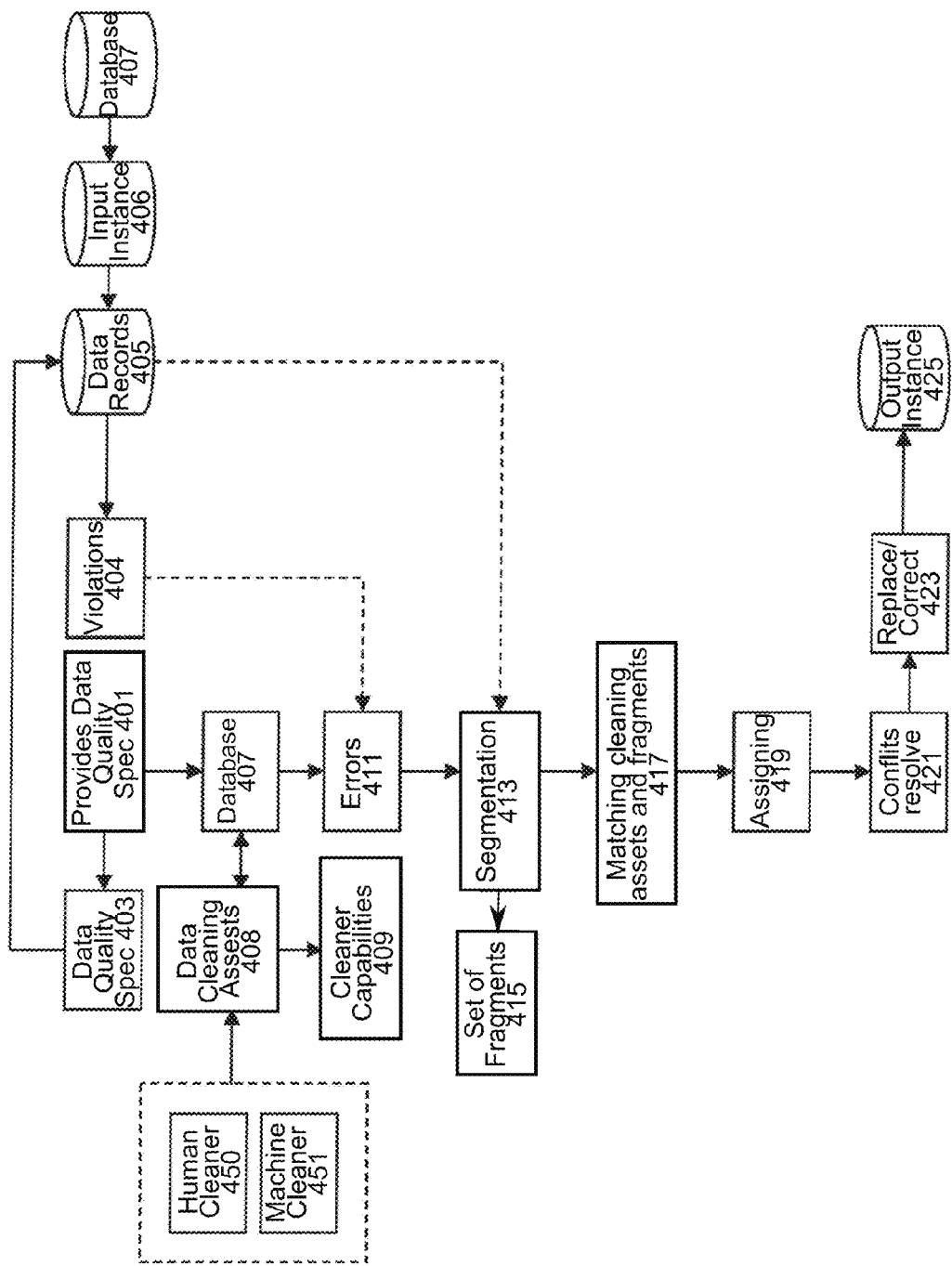
FIG. 4 is a flowchart of a method according to an example.

FIG. 4 is a flowchart of a method according to an example. In block 401 a set of data quality specifications 403 are provided. The specifications allow the identification of errors or violations 404 in data records 405 of an input instance 406 of a database 407, and enable the assessment of quality of an output database instance in which data records which violate a quality specification are corrected. In block 407 multiple data cleaning assets 408 are registered. Each cleaner, whether a human-cleaner 450 or a machine-cleaner 451 is registered in order to declare the capabilities 409 of the cleaner, which can include limitations of the cleaner. In block 411, errors in data records are identified. That is, parts of the database that do not meet the imposed data quality specification are identified. The identification can be performed using human-cleaners and/or machine-cleaners.

In block 413, data records 405 are segmented or partitioned in order to provide a set of fragments 415, each fragment including multiple data records, and wherein a data record may be present in more than one fragment 415. Typically, each fragment can include at least one tuple which violates a data quality specification. Any fragments which do not include any unclean data records can be ignored since no violations will be present.

In block 417, data cleaning assets are matched with fragments 415. This can include a goal for determining which cleaner can be used for each part of data with data quality problems. That is, matching can be performed based on the characteristics of errors found in data and the capabilities of the cleaners. In block 419, matched data cleaning assets are assigned to repair violations in data fragments and to provide candidate corrections for the detected tuples in the fragment. In an example, each part of the data that violates a quality specification is assigned to one or more cleaners that match this part of data. Determining the number of cleaners depends on the quality requirements and the given budget for performing the cleaning task for example. A large task or budget implies that a larger number of assets can be deployed for a task. Accordingly, multiple assets can be deployed to repair violations in any one fragment, resulting in sets of redundant candidate corrections.

In block 421 any conflicts are resolved. For example, cleaning decisions in the form of candidate corrections for tuples can be collected from or otherwise provided by the assigned cleaners in order to resolve conflicts in decisions, for example by using majority voting in which a tuple with a relatively higher confidence measure from measures for the candidate corrections in the redundant sets is used to select a correction.

In block 423, data representing an output instance 425 of database 407 is provided in which data records which violated the one or more data quality specifications 403 are replaced or otherwise corrected according to selected candidate corrections.

Figure 5:
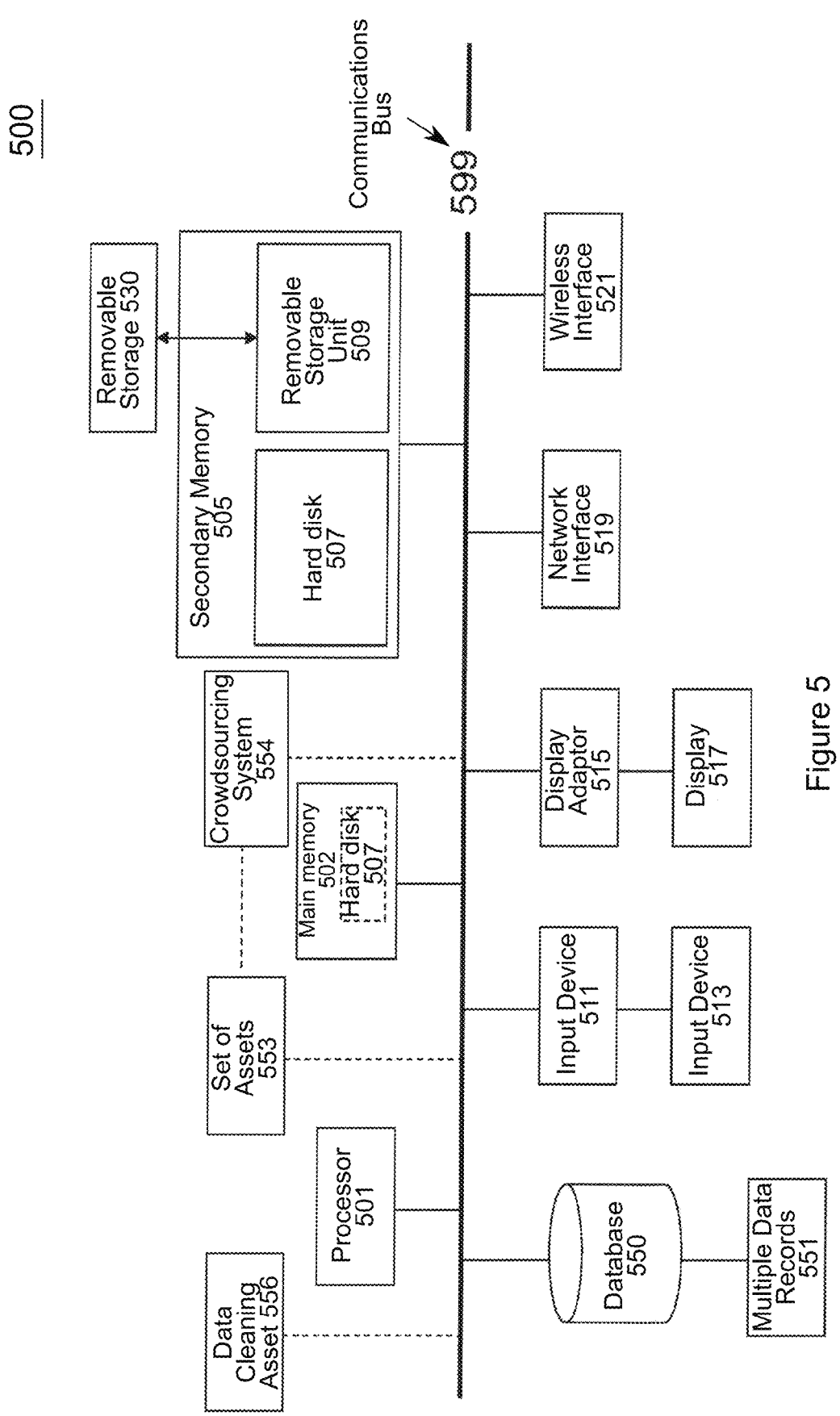
FIG. 5 is a schematic block diagram of an apparatus according to an example.

FIG. 5 is a schematic block diagram of an apparatus according to an example, and which is suitable for implementing any of the systems, methods or processes described herein. Apparatus 500 can be a machine-cleaning asset as described herein for example. Apparatus 500 includes one or more processors, such as processor 501, providing an execution platform for executing machine readable instructions such as software. Commands and data from the processor 501 are communicated over a communication bus 599. The apparatus 500 also includes a main memory 502, such as a Random Access Memory (RAM), where machine readable instructions may reside during runtime, and a secondary memory 505. The secondary memory 505 includes, for example, a hard disk drive 507 and/or a removable storage drive 530, representing a floppy diskette drive, a magnetic tape drive, a compact disk drive, etc., or a nonvolatile memory where a copy of the machine readable instructions or software may be stored. The secondary memory 505 may also include ROM (read only memory), EPROM (erasable, programmable ROM), EEPROM (electrically erasable, programmable ROM).

In addition to software, data representing any one or more of data fragments of files or private-public key pairs for example may be stored in the main memory 502 and/or the secondary memory 505. The removable storage drive 530 reads from and/or writes to a removable storage unit 509 in a well-known manner.

A user can interface with the apparatus 500 with one or more input devices 511, such as a keyboard, a mouse, a stylus, a touch screen device and the like in order to provide user input data for example. The display adaptor 515 interfaces with the communication bus 599 and the display 517 and receives display data from the processor 501 and converts the display data into display commands for the display 517. A network interface 519 is provided for communicating with other systems and devices via a network such as network 103 for example. The apparatus can include a wireless interface 521 for communicating with wireless devices in the wireless community.

It will be apparent to one of ordinary skill in the art that one or more of the components of the apparatus 500 may not be included and/or other components may be added as is known in the art. The apparatus 500 shown in FIG. 5 is provided as an example of a possible platform that may be used, and other types of platforms may be used as is known in the art. One or more of the steps described above may be implemented as instructions embedded on a computer readable medium and executed on the apparatus 500. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. The same is true of computer networks in general. It is therefore to be understood that those functions enumerated above may be performed by any electronic device capable of executing the above-described functions.

In an example, a database 550 includes includes multiple data records 551 to be cleaned. Multiple data cleaning assets 553 are used to determine a set of data records of the database 550 which violate at least one data quality description which can be stored in memory 502 or 505. A selection and allocation module 507 is used to select a data cleaning asset from a set of assets 553 including a user from a crowdsourcing system 554 and a machine-based data cleaning asset 556. Module 507 can be operative from hard drive 505 and loaded into main memory 502 when executed. The module 507 allocates a selected asset to a fragment of the data records in the set, and the selected asset generates a candidate correction for a data record in the set.

The apparatus of FIG. 5 can be in the form of mobile device such as a smart device in the form of a mobile telephone or tablet computing device for example. It is typical to interface with such devices using a touch enabled interface in which a user can interact with various icons and other graphical elements by touch gestures via a display of the device.

Figure 6:
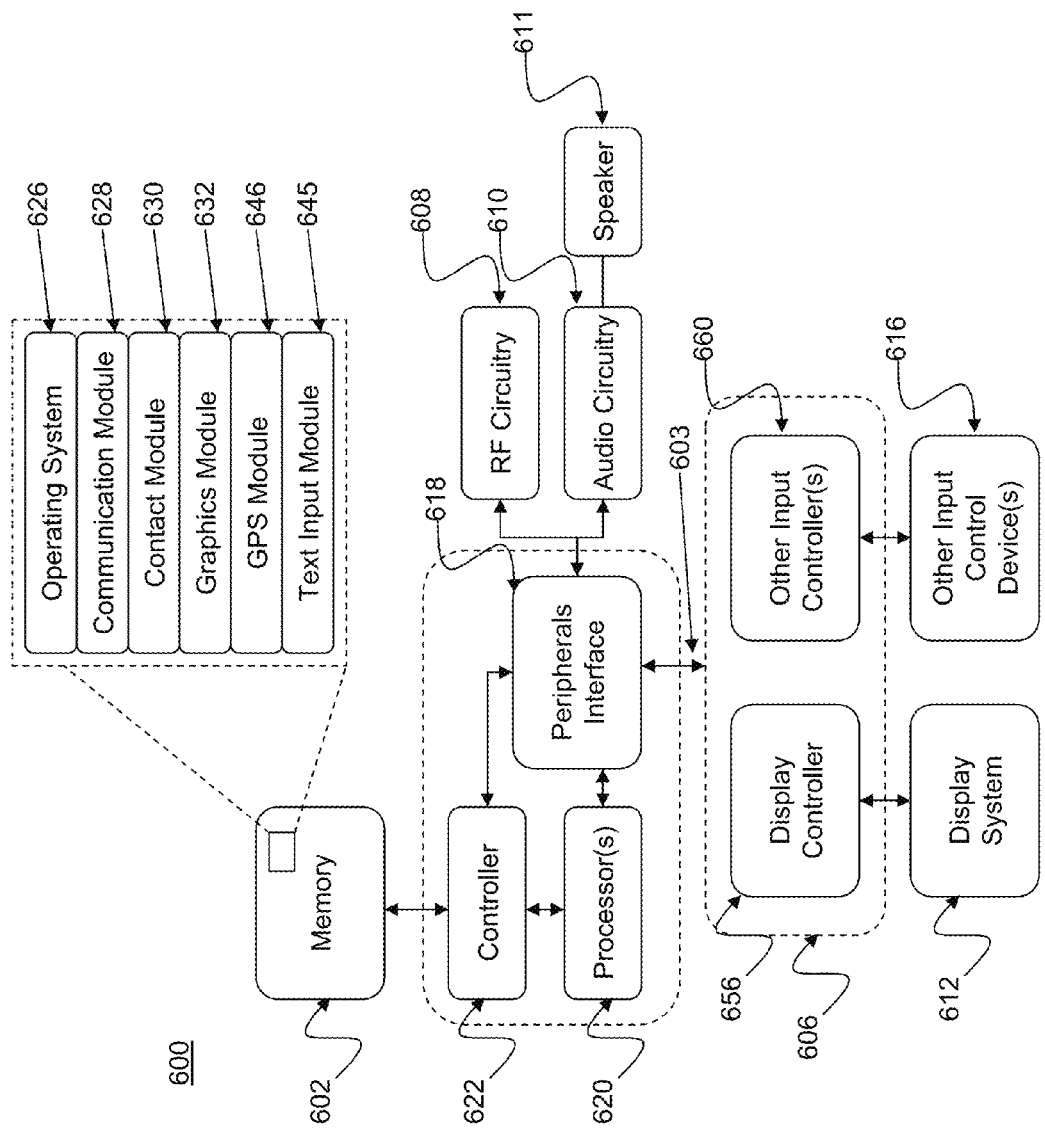
FIG. 6 is a schematic block diagram of a device according to an example.

FIG. 6 is a schematic block diagram of a device 600 according to an example. Device 600 can be a mobile terminal such as a mobile telephone or smart phone for example. In other examples, device 600 can be a PDA or tablet computing device. Other alternatives are possible. Device 600 can be used to provide data from a crowdsourcing module 101 for users 105. For example, details of tasks 117 can be provided using a device such as that described above with reference to FIG. 5 or FIG. 6.

In some examples, the device 600 includes a touch-sensitive display system 612. The touch-sensitive display system 612 is sometimes called a "touch screen" for convenience. In other examples, display system 612 can include a non-touch sensitive display such as an LCD or LED display for example. The device 600 may include a memory 602 (which may include one or more computer readable storage mediums), a memory controller 622, one or more processing units (CPU's) 620, a peripherals interface 618, RF circuitry 608, audio circuitry 610, a speaker 611, an input/output (I/O) subsystem 606 and other input or control devices 616. These components may communicate over one or more communication buses or signal lines 603.

It should be appreciated that the device 600 is only one example of a device 600, and that the device 600 may have more or fewer components than shown in FIG. 6, may combine two or more components, or may have a different configuration or arrangement of the components than that shown. The various components shown in FIG. 6 may be implemented in hardware, software or a combination of both hardware and software, including one or more signal processing and/or application specific integrated circuits for example.

Memory 602 may include high-speed random access memory and may also include non-volatile memory, such as one or more magnetic disk storage devices, flash memory devices, or other non-volatile solid-state memory devices. Access to memory 602 by other components of the device 600, such as the CPU 620 and the peripherals interface 618, may be controlled by the memory controller 622.

The peripherals interface 618 couples the input and output peripherals of the device to the CPU 620 and memory 602. The one or more processors 620 run or execute various software programs and/or sets of machine readable instructions stored in memory 602 to perform various functions for the device 600 and to process data.

In some embodiments, the peripherals interface 618, the CPU 620, and the memory controller 622 may be implemented on a single chip, such as a chip 604. In some other embodiments, they may be implemented on separate chips.

The RF (radio frequency) circuitry 608 receives and sends RF signals. The RF circuitry 608 converts electrical signals to/from electromagnetic signals and communicates with communications networks and other communications devices via the electromagnetic signals. The RF circuitry 608 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth.

The RF circuitry 608 may communicate with networks, such as the Internet, an intranet and/or a wireless network, such as a cellular telephone and/or data network, a wireless local area network (LAN), and other devices by wireless communication. The wireless communication may use any of a plurality of typical communications standards, protocols and technologies.

The audio circuitry 610 and the speaker 611 provide an audio interface between a user and the device 600. The audio circuitry 610 receives audio data from the peripherals interface 618, converts the audio data to an electrical signal, and transmits the electrical signal to the speaker 611. The speaker 611 converts the electrical signal to human-audible sound waves. Audio data may be retrieved from and/or transmitted to memory 602 and/or the RF circuitry 608 by the peripherals interface 618. In some examples, the audio circuitry 610 also includes a headset jack. The headset jack provides an interface between the audio circuitry 610 and removable audio input/output peripherals, such as output-only headphones or a headset with both output (e.g., a headphone for one or both ears) and input (e.g., a microphone).

The I/O subsystem 606 couples input/output peripherals on the device 600, such as the touch screen 612 and other input/control devices 616, to the peripherals interface 618. The I/O subsystem 606 may include a display controller 656 and one or more input controllers 660 for other input or control devices. The one or more input controllers 660 receive/send electrical signals from/to other input or control devices 616. The other input/control devices 616 may include physical buttons (e.g., push buttons, rocker buttons, etc.), dials, slider switches, joysticks, click wheels, trackpads, touch interface devices and so forth. In some alternate embodiments, input controller(s) 660 may be coupled to any (or none) of the following: a keyboard, infrared port, USB port, and a pointer device such as a mouse. The one or more buttons may include an up/down button for volume control of the speaker 611. The one or more buttons may include a push button or slider control. The touch screen 612 can be used to implement virtual or soft buttons or other control elements and modules for a user interface for example.

The touch-sensitive touch screen 612 can provide an input interface and an output interface between the device and a user. The display controller 656 receives and/or sends electrical signals from/to the touch screen 612. The touch screen 612 displays visual output to the user. The visual output may include graphics, text, icons, video, and any combination thereof. In some embodiments, some or all of the visual output may correspond to user-interface objects, further details of which are described below.

A touch screen 612 can include a touch-sensitive surface, sensor or set of sensors that accepts input from the user based on haptic and/or tactile contact. The touch screen 612 and the display controller 656 (along with any associated modules and/or sets of instructions in memory 602) detect contact (and any movement or breaking of the contact) on the touch screen 612 and converts the detected contact into interaction with user-interface objects that are displayed on the touch screen or another display device. In an example, a point of contact between a touch screen 612 and the user corresponds to a finger of the user.

The touch screen 612 and the display controller 656 may detect contact and any movement or breaking thereof using any of a plurality of typical touch sensing technologies, including but not limited to capacitive, resistive, infrared, and surface acoustic wave technologies, as well as other proximity sensor arrays or other elements for determining one or more points of contact with a touch screen 612.

In some example, software components stored in memory 602 may include an operating system 626, a communication module (or set of instructions) 628, a contact module (or set of instructions) 630, a graphics module (or set of instructions) 632, a GPS module 646 and a text input module 645.

The communication module 628 facilitates communication with other devices over one or more external ports (not shown). The contact/motion module 630 may detect contact with the touch screen 612 (in conjunction with the display controller 656) and other touch sensitive devices (e.g., a touchpad or physical click wheel). The contact module 630 includes various software components for performing various operations related to detection of contact, such as determining if contact has occurred, determining if there is movement of the contact and tracking the movement across the touch screen 612, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., multiple finger contacts). Various touch gestures can be used to invoke backup options and operations. For example, a user touching an icon or other element can invoke selection of an application which can be used to backup a file or folder. Another suitable touch gesture can include a "long hold" in which a user touches an icon or other element and does not stop touching it until a contextual menu (for example) appears. Such a menu can include multiple options for backup such as including selecting a file to be backed up, a location and a backup parameter such as a number of backup locations for example.

The graphics module 632 includes various known software components for rendering and displaying graphics on the touch screen 612, including components for changing the intensity of graphics that are displayed. As used herein, the term "graphics" includes any object that can be displayed to a user, including without limitation text, icons (such as user-interface objects), digital images, videos, animations and the like.

The GPS module 646 can determine the location of the device 600 and provide this information for use in various applications (e.g., for use in location-based dialing, for a camera etc. The GPS module 646 can determine the current location of the device 600 for use in determining the most proximate backup centre for example.

The text input module 645, which may be a component of graphics module 632, can provide a soft keyboard for entering text in various applications for the device 600. For example, a soft keyboard can be used by a user to provide textual input relating to answers to questions posed to the user, such as questions relating to an object to be backed up and a backup location(s), or for the determination of other information which can be used to verify or authenticate the user so that information for or about them can be provided and/or retrieved.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 645 may be combined with music player module 646 into a single module (e.g., video and music player module). In some examples, memory 602 may store a subset of the modules and data structures identified above. Furthermore, memory 602 may store additional modules and data structures not described above.

What is claimed is:

1. A computer-implemented method comprising:
   partitioning data representing an input instance of a database including multiple tuples into multiple fragments of tuples;
   detecting tuples which violate a data quality specification in respective ones of the fragments;
   selecting multiple data cleaning assets on the basis of characteristics of errors in detected tuples for a fragment and based on declared asset capabilities;
   assigning multiple selected data cleaning assets to the fragment, the selected multiple data cleaning assets to provide sets of redundant candidate corrections for the detected tuples in the fragment;
   selecting a candidate correction for a tuple with a relatively higher confidence measure from measures for the candidate corrections in the redundant sets, and wherein a confidence measure includes a measure representing a majority vote for a tuple from multiple candidate corrections for the tuple from the redundant sets; and
   providing data representing an output instance of the database in which detected tuples are replaced with selected candidate corrections.

2. A computer-implemented method as claimed in claim 1, further comprising resolving conflicts in candidate corrections.

3. A computer-implemented method as claimed in claim 1, further comprising resolving conflicts in candidate corrections, and wherein resolving conflicts includes selecting a candidate correction in the redundant sets which has a relatively higher confidence measure from measures for the candidate corrections in the redundant sets.

4. A computer-implemented method as claimed in claim 1, further comprising resolving conflicts in candidate corrections, wherein resolving conflicts includes selecting corrections by determining a clean database instance that includes the maximum number tuples which obey the data quality specification.

5. A computer-implemented method as claimed in claim 1, further comprising registering a set of data cleaning assets to declare capabilities of the asset.

6. A computer-implemented method as claimed in claim 1, wherein a data cleaning asset is a machine-based or a human asset.

7. A computer-implemented method as claimed in claim 1, wherein a data cleaning asset is a machine-based or a human asset, further comprising reconciling multiple candidate corrections from assets for a tuple from the multiple candidate corrections from the redundant sets.

8. A computer-implemented method as claimed in claim 1, wherein a data cleaning asset is a machine-based or a human asset, further comprising reconciling multiple candidate corrections from assets for a tuple from the multiple candidate corrections from the redundant sets, and wherein reconciling includes providing a candidate correction which complies with the data quality specification.

9. A system comprising:
   a processor to process a database including multiple data records to be cleaned;
   multiple data cleaning assets to determine a set of data records of the database which violate at least one data quality description; and
   a selection and allocation module to select a data cleaning asset from a set of assets including a user from a crowdsourcing system and a machine-based data cleaning asset, to allocate a selected asset to a fragment of the data records in the set, the selected asset to generate a candidate correction for a data record in the set, and to select candidate corrections by determining a clean database instance that includes the maximum number tuples which obey the data quality description; and using a confidence measure which includes a measure representing a majority vote for a tuple from multiple candidate corrections for the tuple from redundant sets of corrections.

10. A system as claimed in claim 9, wherein a data cleaning asset is a machine-based or a human asset.

11. A system as claimed in claim 9, wherein the selection and allocation module selects and allocates an asset to the fragment to provide redundant sets of candidate corrections, and the processor reconciles multiple candidate corrections from assets for a tuple from the multiple candidate corrections from the redundant sets.

12. A computer program embedded on a non-transitory tangible computer readable storage medium, the computer program including machine readable instructions that, when executed by a processor, implement a method comprising:

partitioning data representing an input instance of a database including multiple tuples into multiple fragments of tuples;

detecting tuples which violate a data quality specification in respective ones of the fragments;

selecting a data cleaning asset on the basis of characteristics of errors in detected tuples for a fragment and based on declared asset capabilities;

assigning multiple selected data cleaning assets to the fragment, the selected multiple data cleaning assets to provide sets of redundant candidate corrections for the detected tuples in the fragment;

selecting a candidate correction for a tuple with a relatively higher confidence measure from measures for the candidate corrections in the redundant sets, and wherein a confidence measure includes a measure representing a majority vote for a tuple from multiple candidate corrections for the tuple from the redundant sets; and providing data representing an output instance of the database in which detected tuples are replaced with selected candidate corrections.

\* \* \* \* \*